(12) United States Patent
Hanser et al.

(10) Patent No.: US 7,717,485 B1
(45) Date of Patent: May 18, 2010

(54) UNIVERSAL ROOM EXTENSION FOR EXPANDABLE ROOMS

(75) Inventors: Paul Edmund Hanser, Tipton, IA (US); Vincent Buls, Tipton, IA (US)

(73) Assignee: HWH Corporation, Moscow, IA (US)

( * ) Notice: Subject to any disclaimer, the term of this patent is extended or adjusted under 35 U.S.C. 154(b) by 388 days.

(21) Appl. No.: 11/693,297

(22) Filed: Mar. 29, 2007

(51) Int. Cl.
B60P 3/34 (2006.01)

(52) U.S. Cl. ............. 296/26.13; 296/26.01; 296/26.12; 52/67

(58) Field of Classification Search ............ 296/156, 296/164, 165, 168, 171, 172, 173, 175, 176, 296/26.01, 26.12, 26.13; 52/64, 67
See application file for complete search history.

(56) References Cited

U.S. PATENT DOCUMENTS

| | | | | |
|---|---|---|---|---|
| 5,902,001 | A | * | 5/1999 | Schneider ................ 296/26.13 |
| 5,908,215 | A | | 6/1999 | Hanser et al. |
| 5,997,074 | A | | 12/1999 | Alexander |
| 6,052,952 | A | | 4/2000 | Frerichs et al. |
| 6,067,756 | A | | 5/2000 | Frerichs et al. |
| 6,533,338 | B1 | | 3/2003 | Frerichs et al. |
| 6,568,734 | B2 | | 5/2003 | Buls et al. |
| 6,619,713 | B2 | * | 9/2003 | Eichhorn ................ 296/26.01 |
| 6,644,719 | B2 | | 11/2003 | Young, Sr. |
| 6,658,798 | B1 | | 12/2003 | Frerichs et al. |
| 6,679,541 | B1 | * | 1/2004 | Hanser et al. ............ 296/171 |
| 6,681,531 | B2 | * | 1/2004 | McManus ................ 52/67 |
| 6,684,138 | B1 | | 1/2004 | Friede et al. |
| 6,729,670 | B1 | | 5/2004 | Buls et al. |
| 6,905,154 | B1 | * | 6/2005 | Buls et al. ............ 296/26.13 |
| 6,976,721 | B2 | * | 12/2005 | Rasmussen ............ 296/26.14 |

* cited by examiner

Primary Examiner—Patricia L Engle
Assistant Examiner—SunSurraye Westbrook
(74) Attorney, Agent, or Firm—Jason R. Sytsma; Shuttleworth & Ingersoll, PLC

(57) ABSTRACT

A mechanism to affect the coordinated movement of an expandable room in a recreational vehicle. The mechanism comprises a drive chain assembly and a lift assembly. The drive chain assembly has a pair of drive chains (upper and lower) that move generally vertically along vehicle structural members and then the chains are redirected for horizontal travel as the main hydraulic cylinders are actuated to extend or retract the expandable room. The movement of the upper and lower drive chains is synchronized by a rack-and-pinion mechanism. The lift assembly controls vertical movement of the room so that when the room is fully extended, the floor of the vehicle and the floor of the expandable room are substantially flush. The lift assembly comprises at least one lift cylinder for raising and lowering the room. The lift cylinder is vertically combined with the lower end of the structural member.

18 Claims, 10 Drawing Sheets

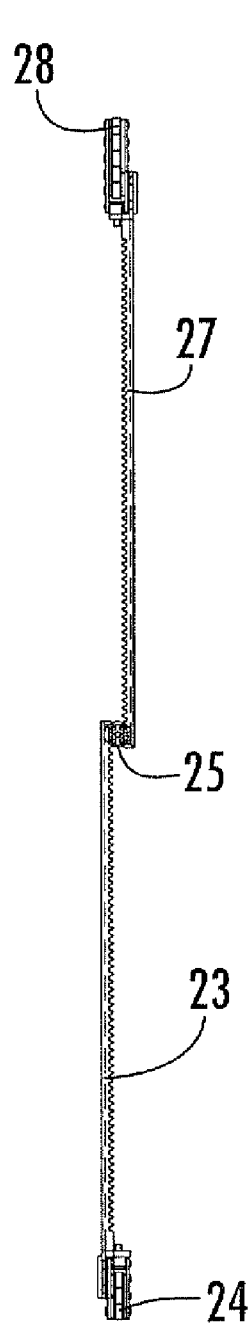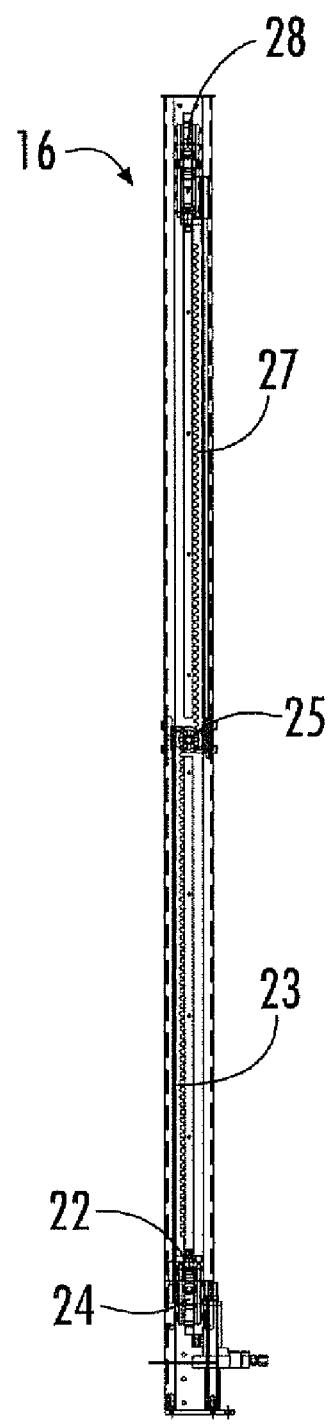
FIG. 5
FIG. 6

UNIVERSAL ROOM EXTENSION FOR EXPANDABLE ROOMS

BACKGROUND OF THE INVENTION

The invention relates to a linkage arrangement for moving members together or apart in a substantially horizontal motion without a substantial shift in a direction perpendicular to the desired linear motion while still allowing the members to move a limited distance vertically under controlled conditions. Typical linkages that are commonly used for a variety of purposes involve a pair of parallel members attached pivotally to a pair of parallel linkage members to form a parallelogram. If one of the parallel members is fixed, then motion of the parallelogram linkage results in an angular motion—in or out and up or down rather than simply in or out. Other known arrangements teach a linkage arrangement of the "X" or scissors type for moving members relative to one another in a substantially linear motion. The present invention utilizes a chain driven linkage arrangement for moving the members horizontally relative to each other while allowing for controlled and limited vertical movement.

The invention disclosed herein is particularly useful as a control mechanism for expandable rooms in habitable structures, especially room structures that are telescopically slideable between retracted and extended positions for motorized or towed vehicles. A variety of recreational vehicles are known and used that have a room or a room portion that may be moved from a retracted position while the vehicle is moving over the road to an extended position when the vehicle is stationary in order to provide additional internal space. This type of an arrangement provides adequate space to accommodate users when a recreational vehicle is parked for habitation while still keeping the vehicle within governmental regulations that impose width limitations for vehicles traveling over the road and along highways. When these vehicles are stationary, they are frequently used for habitation for extended periods of time, and when so used, it is highly desirable to be able to maximize the available living space. This is done in a variety of ways in which the user can move a "nested" portion of the expandable room out to its extended or expanded position, typically under hydraulic or electrical power.

These expandable room portions usually comprise a structure that includes a floor, a roof, an external end wall (typically generally parallel to the vehicle side wall), an open (or openable), interior end wall, and one or more side walls (typically generally perpendicular to the vehicle side wall). These components are typically made of frame members and wall panels. In the retracted position, the roof, floor and side walls are typically concealed from exterior view and the room exterior end wall forms a portion of the vehicle side wall. A large factor in the purchase of a vehicle of this type is the amount of useable space that is available inside the vehicle. Thus, it is desirable that the mechanism for extending and retracting the room take up a minimum of space.

The prior art for expanding and retracting expandable rooms generally employs hydraulic arms that are housed inside the vehicle or under the floor of the vehicle. The hydraulic arms contained within the vehicle require a housing unit when they are in their retracted position. This housing unit remains intact when the room is extended taking up space within the vehicle. The hydraulic arms that are housed under the floor are generally complex, relatively expensive, and may be unduly heavy. Further, when the room is in the retracted position, otherwise available storage space under the floor is lost. The additional weight also adversely affects the fuel economy of the vehicle. With the highly competitive market in these recreational vehicles, not only weight and space but also cost and reliability of operation are important factors.

Examples of improved types of linkage assemblies utilized in these expandable rooms are disclosed in U.S. Pat. No. 6,568,734 entitled "Straight Motion Parallelogram Linkage", U.S. Pat. No. 6,729,670 entitled "Linkage for Expandable Rooms" and U.S. Pat. No. 6,679,541 entitled "Chain Driven Linkage Assemblies for Room Extensions". It is an object of this invention to provide another type of mechanism for expanding rooms for vehicles which mechanism is reliable in use, lightweight, has fewer components and which will allow for maximum space inside the vehicle. It is a further object to provide a chain-drive assembly that provides for improved motion of structural members together or away from one another in a substantially linear path while allowing limited movement of the members in a direction perpendicular to said path. It is a further object to provide a mechanism for the expansion and retraction of expandable rooms or structures when the rooms or structures are not designed for convenient housing of the mechanism in the floor. It is also an object of the present invention to provide a mechanism wherein a force assist means such as, for example, a hydraulic cylinder, electric drive, or pneumatic control system can be used to drive the movement of a push-pull chain that in turn moves an expandable room, and if needed, such a chain can be provided on both sides of the room and synchronized. Finally, it is an object of the invention to provide a lifting mechanism that allows the expandable room to be flush with the floor of the vehicle when extended and then raised to be positioned on top of the vehicle floor when the expandable room is retracted.

SUMMARY OF THE INVENTION

The present invention comprises a drive chain assembly and a lift assembly to affect the coordinated movement of an expandable room in a recreational vehicle. Each assembly can be powered by a hydraulic drive, electric drive, pneumatic drive, or any other suitable power system. The drive chain assembly has an upper drive chain and a lower drive chain. The drive chains move generally vertically along vehicle structural members and then the chains are redirected for horizontal travel as the main hydraulic cylinders are actuated to extend or retract the expandable room. The drive chains are pivotally connected at the proper place on the vehicle structural members and are constructed and guided to provide the required force for extending and retracting the room.

In one embodiment, there are drive chain assemblies on each side of the expandable room so that force is applied to each corner of the room. This arrangement creates four points of contact with the room which increases the stability and control of the room. Another benefit of this four point design is the reduction of stresses on the chains and internal components. Further, since the upper drive chain exits the structural member near the structural member's top and the lower drive chain exits the structural member near the structural member's bottom, the main cylinder or driving member can be mounted inside the structural member between the two horizontally extending portions of the chains. This allows the overall width of the mechanism to be reduced as well as keep the weight of components to a minimum.

The lift assembly controls vertical movement of the room so that when the room is fully extended, the floor of the vehicle and the floor of the expandable room are substantially flush. The lift assembly comprises at least one lift cylinder for raising and lowering the room. The lift cylinder is vertically embedded at the lower end of the structural member. The lift cylinder moves vertically in the structural member and comprises a vertically movable member that extends under the floor of the room which provides a surface for the room to slide on. Placing the lift cylinder vertically in this fashion allows the assembly to use minimal coach space for the level-out feature.

The lift assembly and drive chain assembly are coupled with a drive circuit that controls the path of the room, i.e. controls when the main cylinder and lift cylinder are actuated. In one embodiment, a single hydraulic circuit controls two main cylinders and two lift cylinders. As the room is retracted from an extended position, the circuit directs power to the lift assembly to lift the room vertically. A switch determines when the room is fully lifted, and then power is supplied to the main cylinders to retract the room horizontally. The circuit in this embodiment is preferably a regenerative circuit which means that power is supplied to both the lift and main cylinders while the room is retracting (main cylinders extending); however, power is only supplied to the main cylinders when the room is being extended (main cylinders retracting). Since the lift cylinders are not powered during extension of the room, gravity is free to act upon the room. To prevent the room from damaging the interior floor of the vehicle, a ramp assembly is used to provide a raised bearing surface above the recreational vehicle's interior floor for the room to slide on. These ramp assemblies are low friction blocks that are adjustable vertically to make sure the room does not make contact with the finished surface of recreational vehicle's interior floor as it slides. The room continues to slide outward on these bearing surfaces until the room drops off the ramp and down into the position where the interior and slide-out room floor are substantially flush.

In another embodiment, the main cylinders and lift cylinders are controlled by separate circuits. The circuits are in communication with each other to alert the other when to function. This embodiment uses switches that detect the horizontal and vertical position of the room. To retract the room from its extended position, the lift assembly is activated. The horizontal retract of the room does not begin until the vertical position switch detects that the room has been lifted fully. Once fully lifted, the vertical position switch activates the horizontal retract of the room. Conversely, when the room is being extended, the room extends until the horizontal position switch detects that the room is fully extended. At this point the vertical drop would be activated and the room lowers to the fully extended position with both the interior and slide-out room floor being flush. This two circuit configuration eliminates the need for the ramp assemblies since the room is controlled in each direction by separate circuits and the lift cylinder is able to support the weight of the room during both extend and retract functions.

BRIEF DESCRIPTION OF THE DRAWING

FIG. 5 is a side view of the rack and pinion mechanism;

FIG. 6 is a front section view of an embodiment of the invention in the retracted position showing the rack and pinion mechanism;

DETAILED DESCRIPTION OF THE INVENTION

Figure 1:
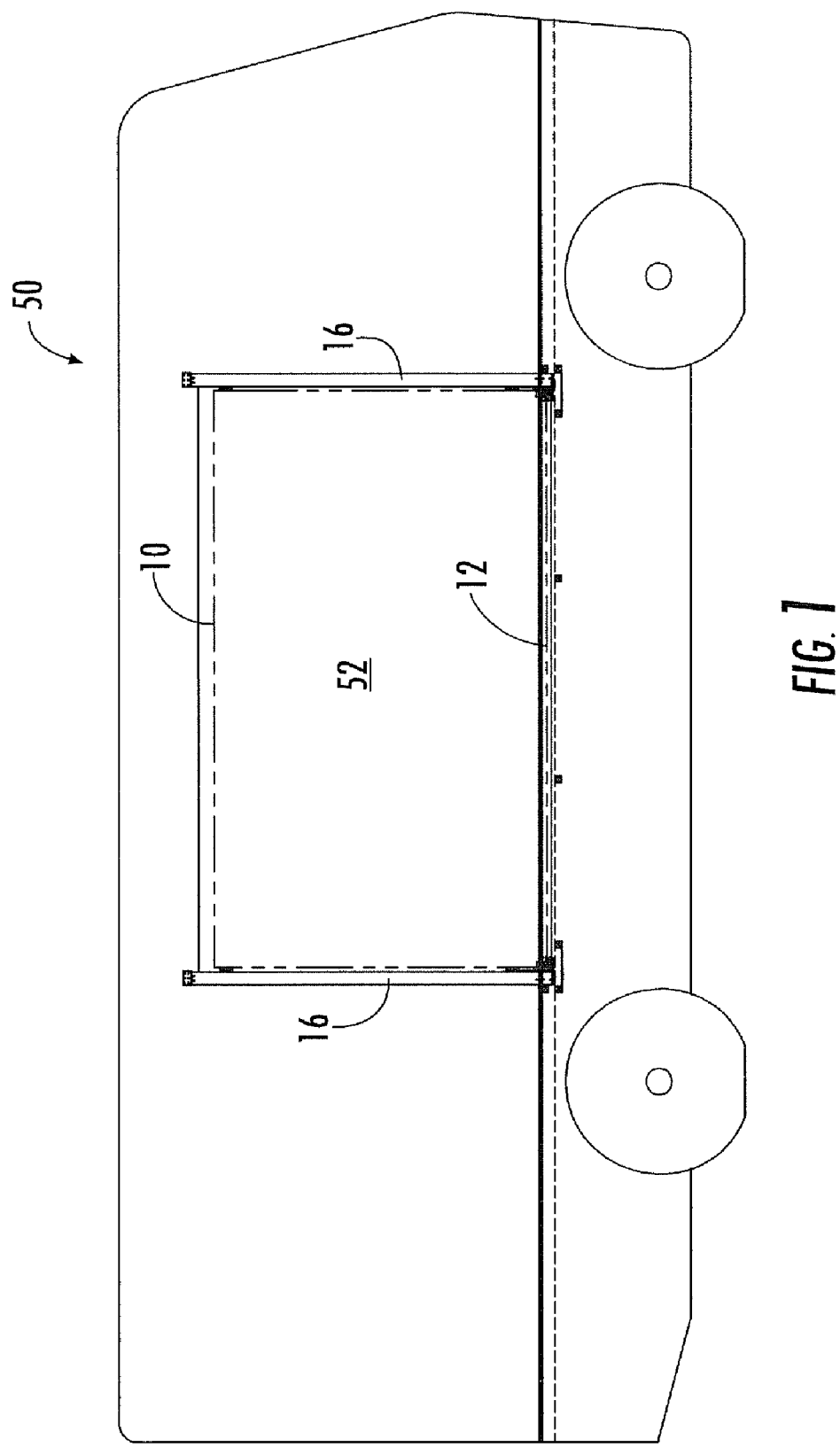
FIG. 1 is a side view of a recreational vehicle having an expandable room.
Figure 2:
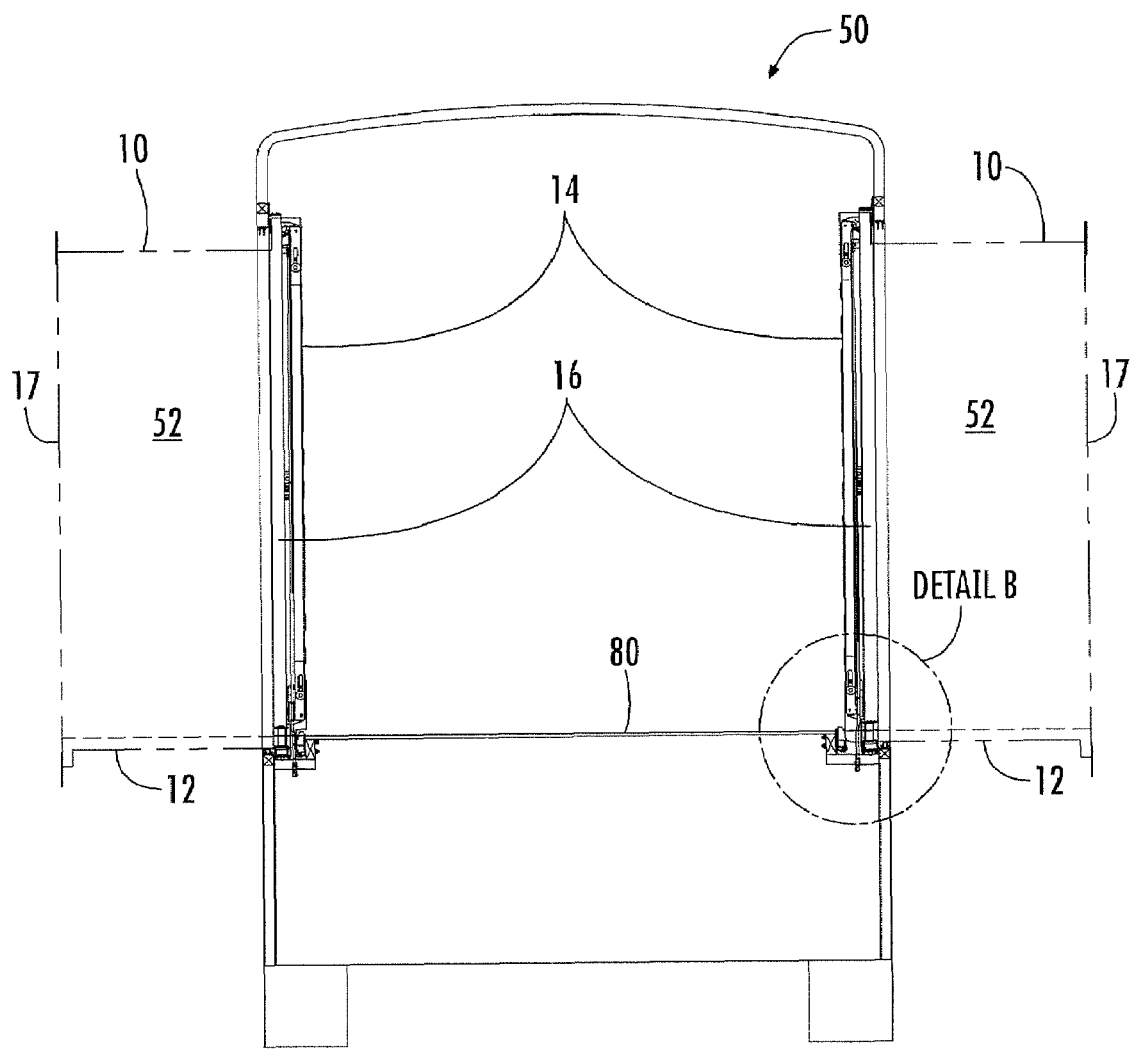
FIG. 2 is a rear view of a recreational vehicle having expandable rooms on both sides showing the rooms in their extended position.
Figure 2A:
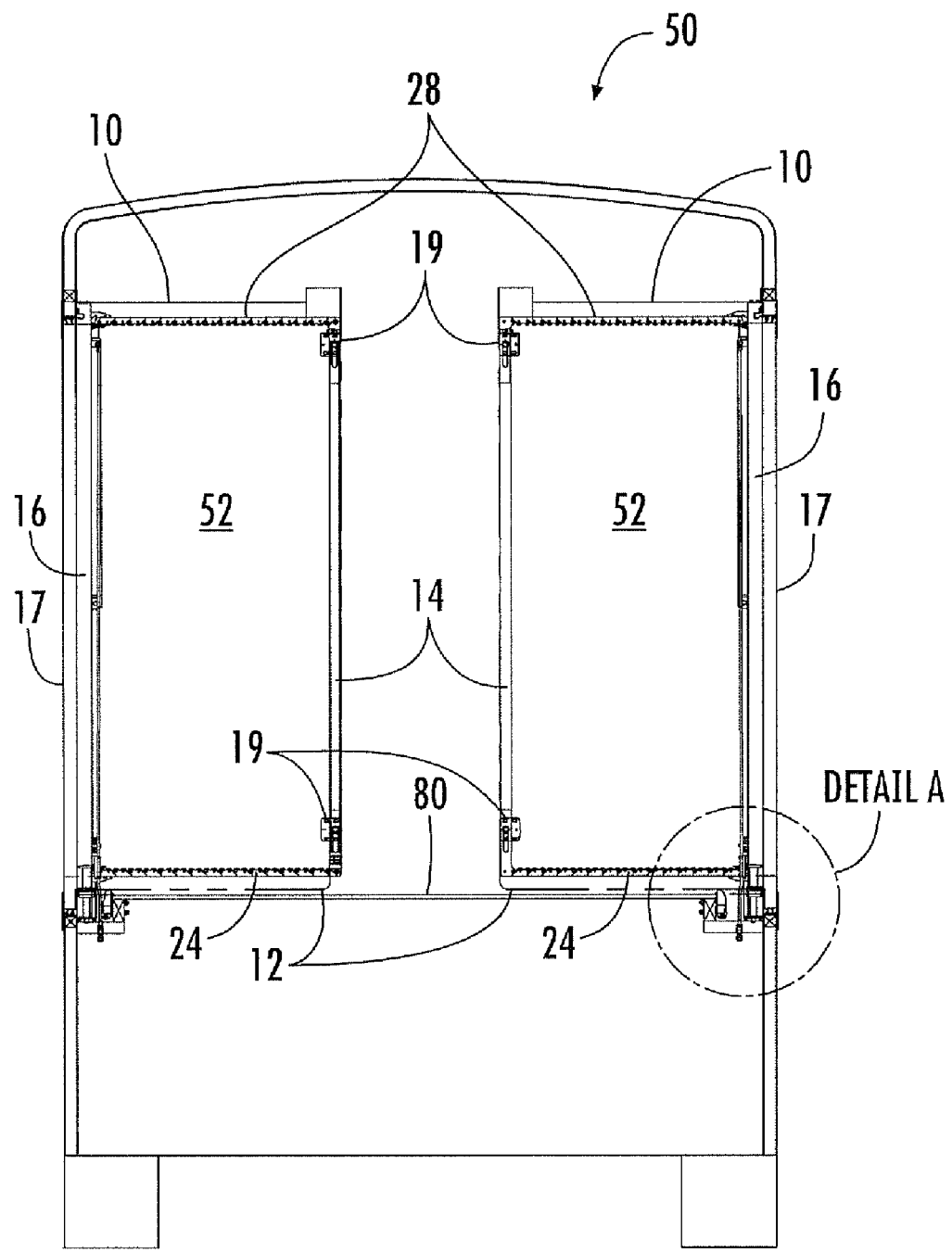
FIG. 2a is a rear view of a recreational vehicle having expandable rooms on both sides showing the rooms in their retracted position.

FIGS. 1, 2, and 2a illustrate a recreational vehicle 50 with at least one expandable room 52 having a drive chain assembly to control the horizontal movement of the room 52 and a lift assembly to control the vertical movement of the room 52. The invention is described herein as being applicable to an expandable room 52 that extends outwardly from a side wall of the recreational vehicle 50, but the principles of the invention are applicable to the expansion and retraction of a movable structure in other applications as well.

Referring first to FIGS. 3-7, there is illustrated a portion of the framework for an expandable room 52 for a recreational vehicle 50 which, as is know to those skilled in the art, has an opening formed in its side wall to accommodate an expandable room 52.

Figure 3:
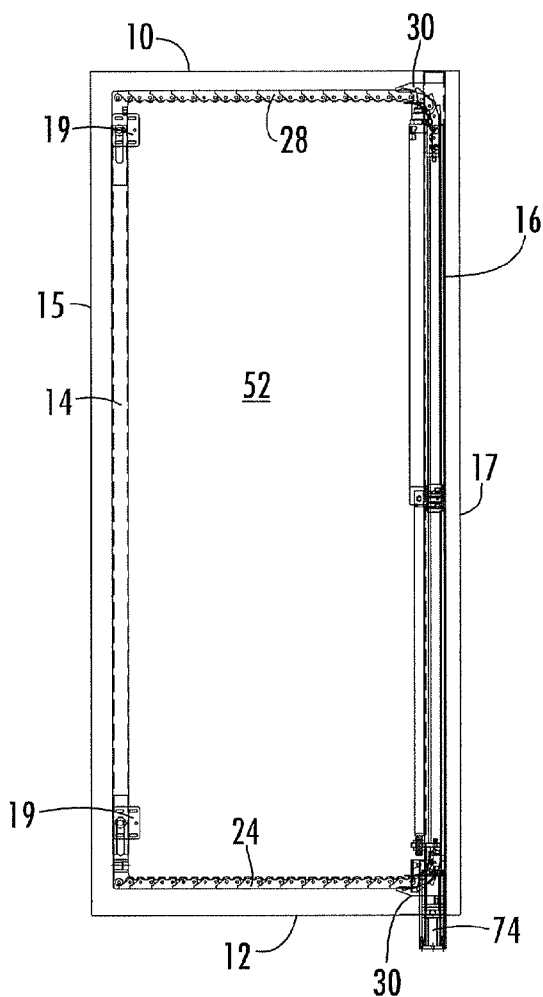
FIG. 3 is a side view of an embodiment of the invention showing the room in its retracted position.
Figure 4:
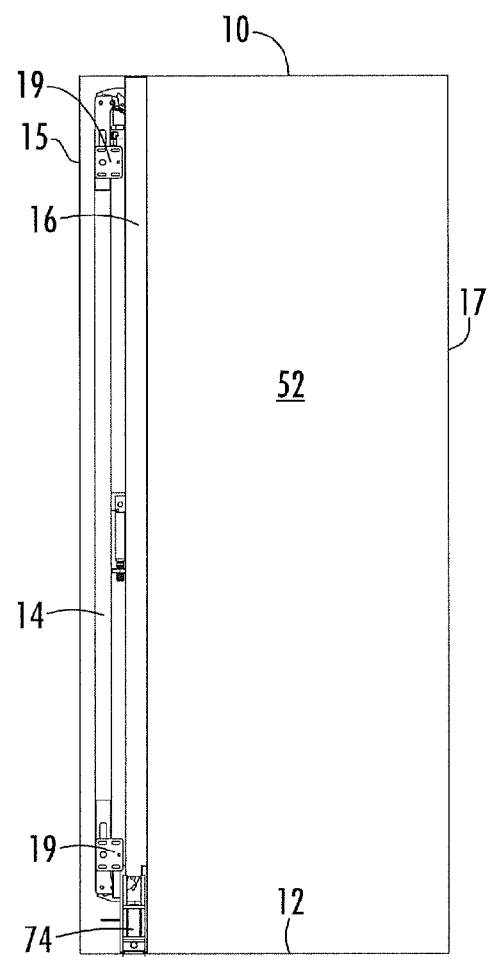
FIG. 4 is a side view of an embodiment of the invention showing the room in its extended position.
Figure 7:
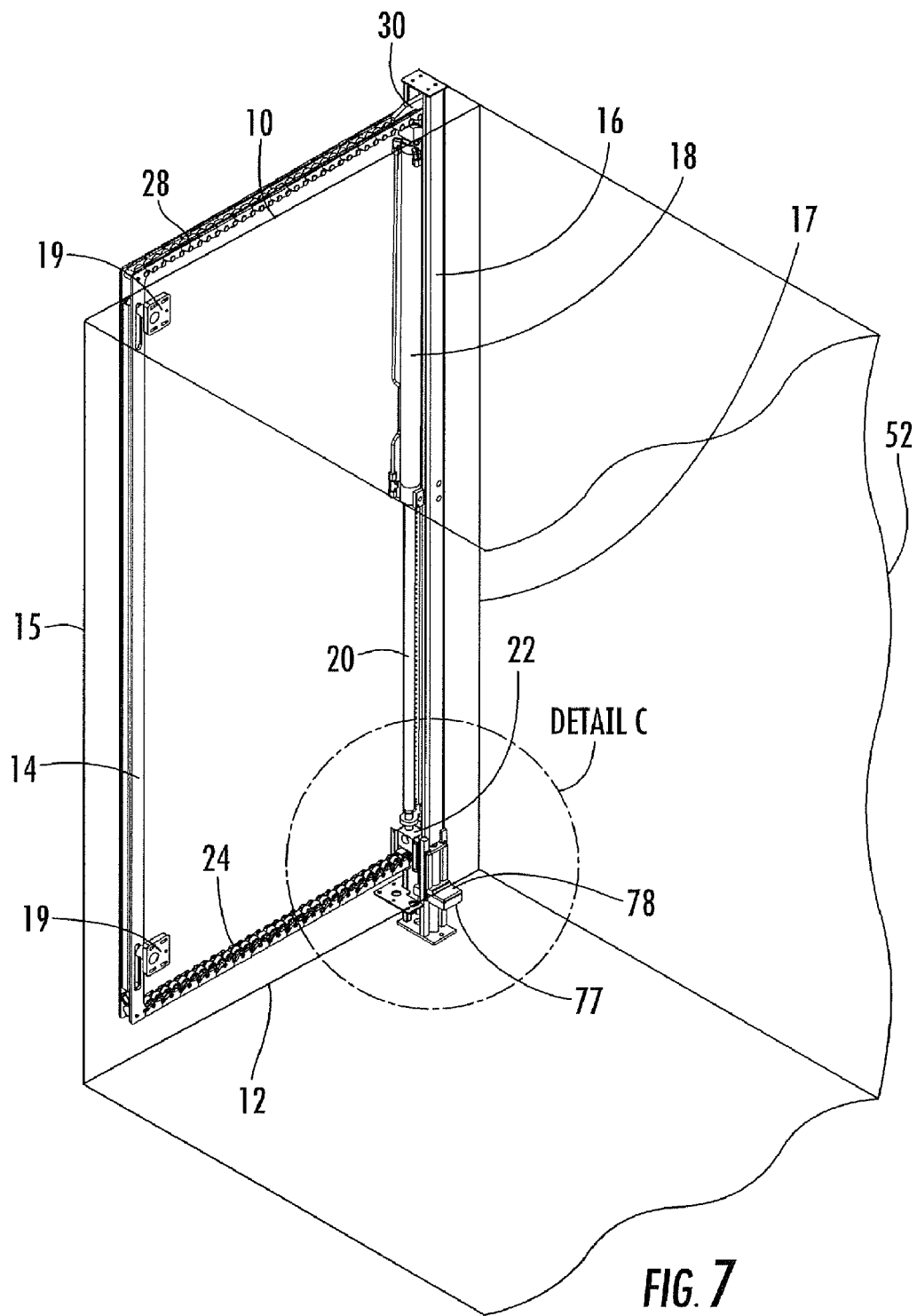
FIG. 7 is a perspective view of an embodiment of the invention showing the room in its retracted position.
Figure 8:
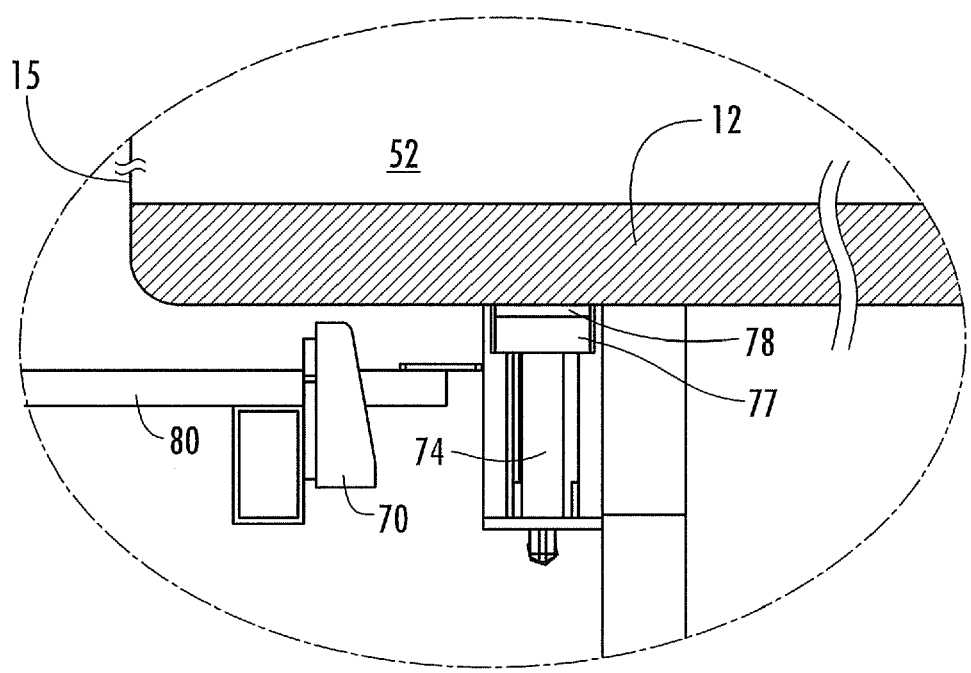
FIG. 8 is a detailed view taken from detail A of FIG. 2a showing the lift cylinder raised and the room mostly retracted.
Figure 9:
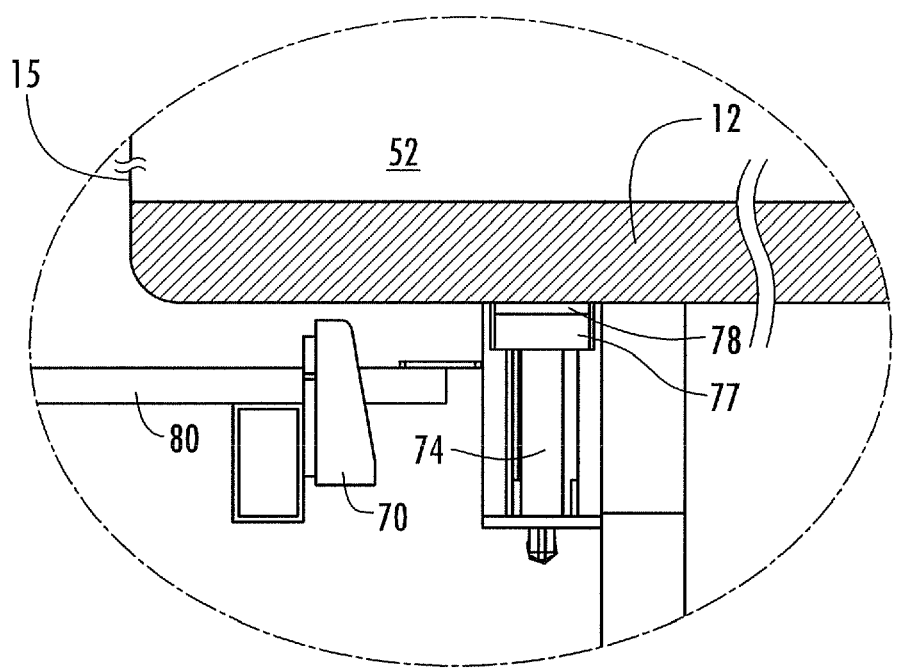
FIG. 9 is a detailed view similar to FIG. 8 but showing the lift cylinder raised and the room mostly extended.

The expandable room 52 has an upper horizontal frame member 10 and a lower horizontal frame member 12 that form a part of an interior side wall of the expandable room 52. The upper surface of the frame members 12 defines the floor of the expandable room 52. Each of the side walls formed by the upper and lower frame members 10 and 12 are connected by a vertical frame member 14 near the interior end wall 15 of the expandable room 52. As seen in FIGS. 3, 4, and 7, the frame member 14 comprises brackets 19 that attach to the room 52. The outer ends of the upper and lower frame members 10 and 12 are connected by vertical frame members (not shown) that form the outer end wall 17 of the expandable room 52. The side walls shown in FIGS. 3-7 are interconnected by lateral support members (not shown) that form a box-like structure that defines the expandable room 52. The expandable room 52 nests within the vehicle 50 between vertical supports 16 that form a part of the vehicle 50 side wall structure. An example of an expandable room 52 for a recreational vehicle 50 of the general type to which the invention relates is shown in U.S. Pat. No. 6,067,756. The basic structure of expandable rooms of various sizes are well know to those skilled in the art and therefore all the details of the vehicle 50 and expandable room structures will not be described.

Figure 10:
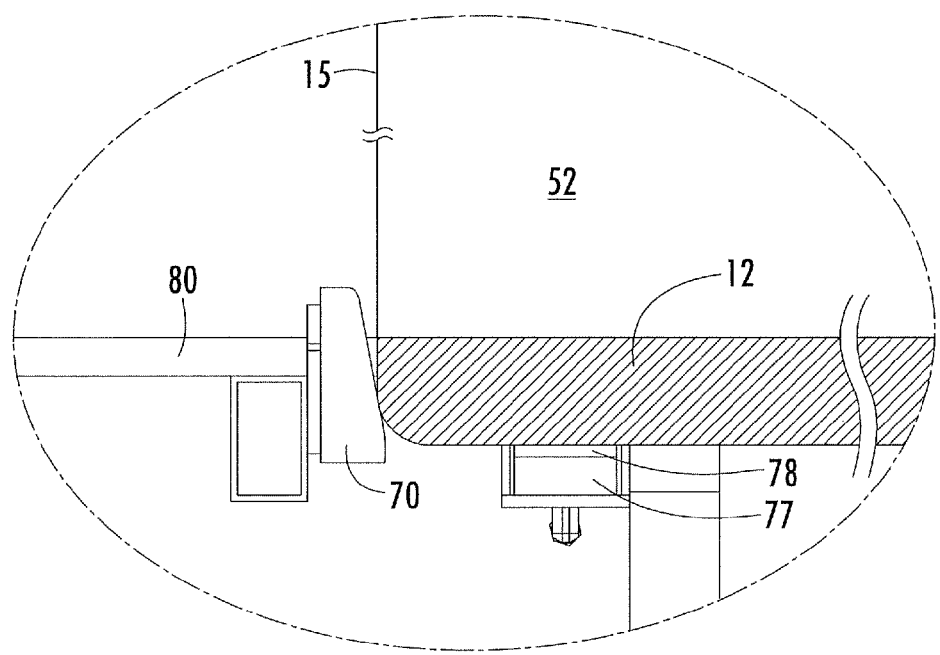
FIG. 10 is a detailed view taken from detail B of FIG. 2 showing the lift cylinder lowered so that the floor of the vehicle and the floor of the expandable room are substantially flush.

When the vehicle 50 is traveling over the road, the expandable room 52 is retracted (FIGS. 2a, 3, 6, and 7) so that the outer end wall 17 of the expandable room 52 is generally flush with the exterior wall of the recreational vehicle 50 that includes vertical support members 16. FIGS. 2, 4, and 10 show the expandable room 52 structure in the extended position with the frame members 14 near the interior end wall 15 of the expandable room 52 positioned adjacent the vehicle support members 16.

As best seen in FIG. 7, mounted in the vehicle vertical support 16 is a force assist member, such as a main hydraulic cylinder 18, having an operating rod 20 to which is connected to a bracket 22 that is in turn connected to the end of a lower chain 24. As seen best in FIGS. 5 and 6, extending vertically inside the vertical support 16 is a rack-and-pinion mechanism comprising an upper rack 27 and a lower rack 23 operatively combined by a gear 25. The upper rack 27 is combined with the upper chain 28 and the lower rack 23 is combined with the lower chain 24. In one embodiment shown in FIG. 6, the lower rack 23 is combined with the lower chain 24 by bracket 22. In use, as the lower chain 24 is moved downward by the cylinder 18, the lower rack 23 moves likewise causing the gear 25 to rotate. The rotation of the gear 25 causes the upper rack 27 to move in the opposite direction as the lower rack 23. This forces the upper chain 28 to move outward from the mechanism at the same rate as the lower chain 24 is moving outward from the mechanism. Thus, the rack-and-pinion mechanism provides for simultaneous movement of both chains 24 and 28 when the operating rod 20 moves to either push or pull the chains 24 and 28. This design allows a single acting driving force (i.e., main cylinder 18) to help synchronize the movement of these chains 24, 28 in opposite directions to each other. One benefit of this arrangement is that the upper chain 28 can be located near the top of the mechanism for attachment near the top of the room 52, as seen in FIG. 7.

The chains 24 and 28 are guided for vertical movement inside the vertical support 16, and the chains 24 and 28 exit the vertical support 16 through a guide member 30 (FIG. 3) that turns the chains 24 and 28 from vertical to horizontal where the other ends of the chains 24, 28 are connected to the vertical frame members 14 near the interior end wall 15 of the expandable room 52. Each of the drive chains 24 and 28 are comprised of consecutive links pivotally connected to each other and are of a type that allow the drive chains 24 and 28 to flex in one direction only thereby allowing the chain 24, 28 to be pushed from one end link to the other end link as well as being pulled. A chain of this type is well known to those skilled in the art and is more specifically described in U.S. Pat. No. 6,679,541, which is hereby incorporated by reference. Thus, as the operating rod 20 of hydraulic cylinder 18 travels vertically, chains 24 and 28 are pushed or pulled to move the expandable room 52 horizontally between a retracted position or an extended position.

Figure 11:
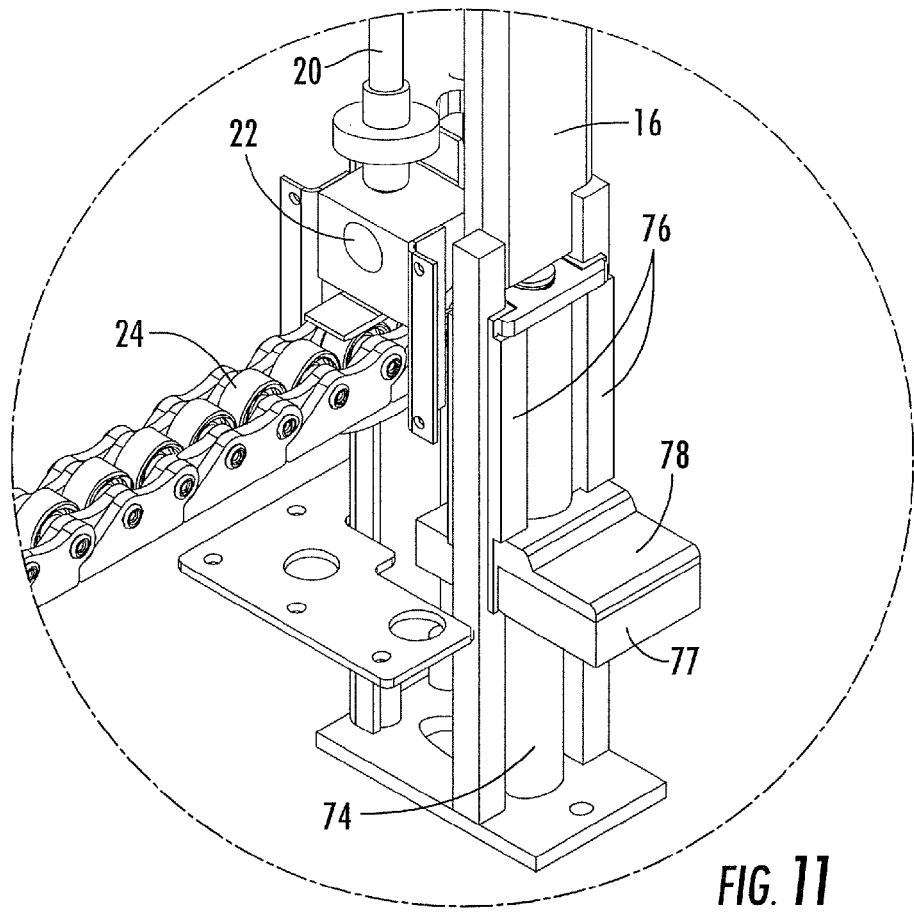
FIG. 11 is a detailed view taken from detail C of FIG. 7 showing the lift cylinder raised.

The lift assembly controls vertical movement of the room 52 so that when the room 52 is fully extended, the floor of the vehicle 80 and the floor 12 of the expandable room 52 will be substantially flush (FIGS. 2 and 10). The lift assembly is generally shown in FIGS. 8-11 and comprises a lift assist mechanism, such as a hydraulic lift cylinder 74, which aids in the raising and lowering of the room 52. The lift cylinder 74 is vertically embedded at the lower end of the vertical support 16. The lift cylinder 74 moves vertically within the vertical supports 16. The lift cylinder 74 has a movable member 77 that moves along track 76 and extends outwardly to support the room 52. As seen in FIG. 11, track 76 is combined with vertical support 16. In some embodiments, the member 77 comprises a bearing pad surface 78 adapted to contact the lower surface of the room 52. This pad 78 has a low friction surface that allows the room 52 to move over it without creating a large amount of friction resulting in reduced stress on the mechanisms. As the cylinder 74 is extended (FIGS. 8 and 9), the cylinder 74 raises the member 77 upward which causes the room 52 to raise upward. To lower the room 52, the cylinder 74 is retracted, which allows the room 52 to drop. In some embodiments, the lift cylinder 74 does not retract under power; rather, the weight of the room 52 retracts the cylinder 74 as gravity acts on it. This lift assembly design is significantly smaller than designs previously used and requires no more space above the floor 80, 12 than what is used by the vertical supports 16 for the horizontal movement of the room 52.

Figure 12:
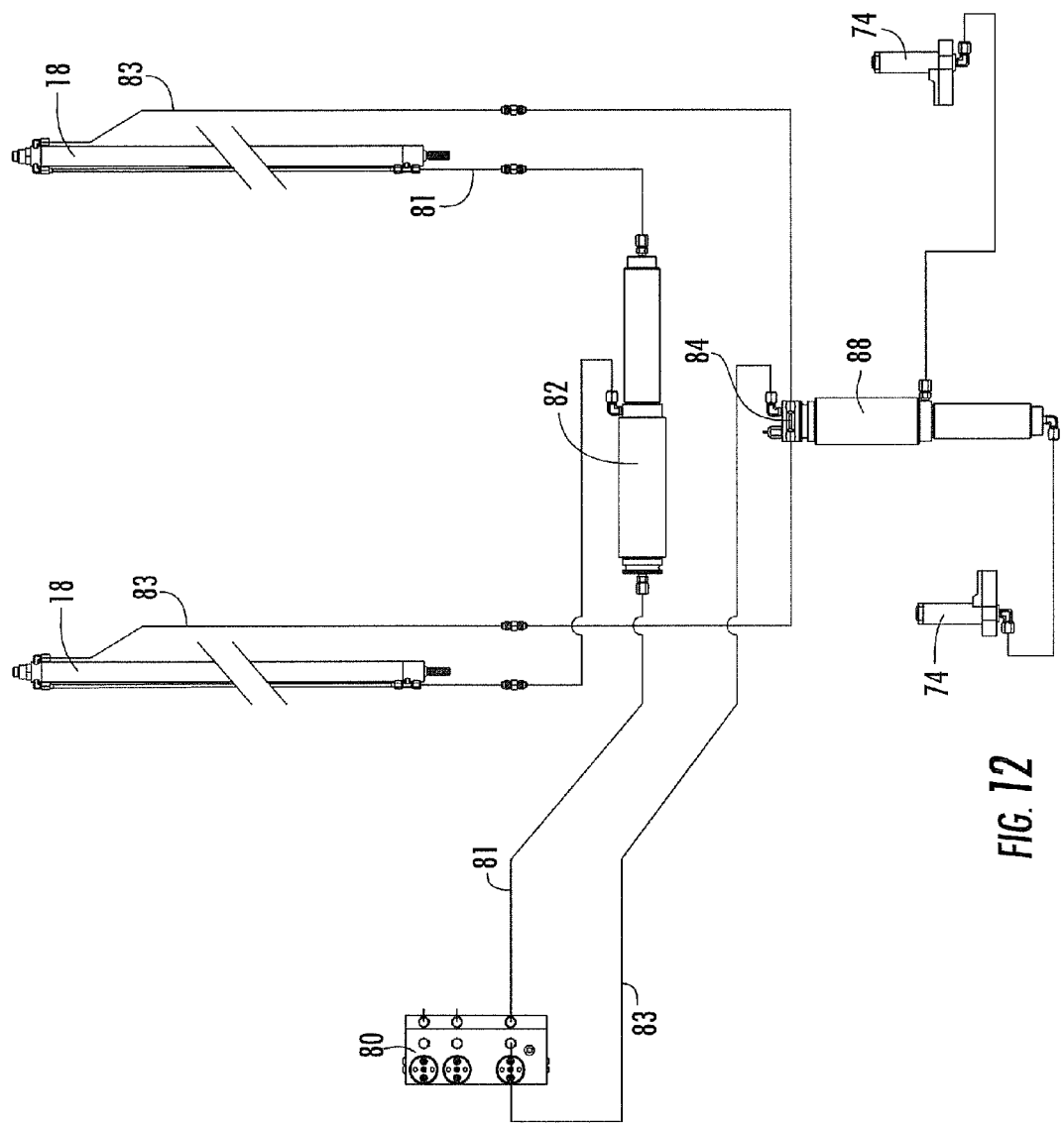
FIG. 12 is a schematic diagram of an embodiment of the invention wherein the lift cylinders and the main cylinders operate on the same hydraulic circuit.
Figure 13:
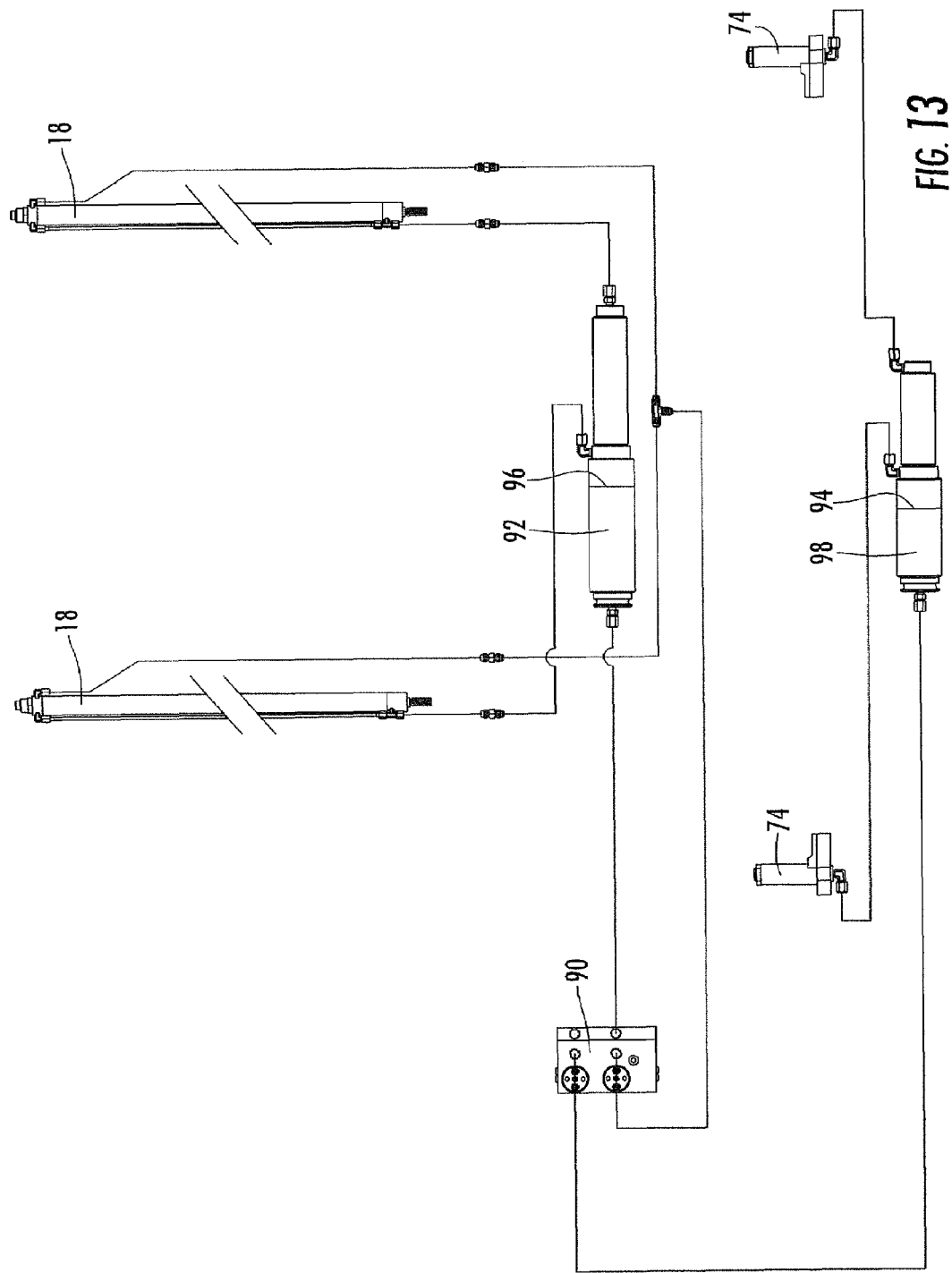
FIG. 13 is a schematic diagram of an embodiment of the invention wherein the lift cylinder and the main cylinders operate on different hydraulic circuits.

FIGS. 12 and 13 show circuit diagrams of two different embodiments of the invention. It should be noted that the invention is not limited to the two circuit configurations shown in these diagrams. Further, as noted above, any suitable power source may be used with this invention, including hydraulic, electric, or pneumatic. FIG. 12 shows an embodiment wherein the lift cylinders 74 and main cylinders 18 are powered by a single regenerative circuit. As is known in the art, in a regenerative circuit there is pressure on the cap side 83 and the rod side 81 of the system while the cylinders 18 are extending (room 52 is retracting), however, there is only pressure on the rod side 81 when the cylinders 18 are retracting (room 52 is extending). In a regenerative circuit, the cap 83 and rod 81 sides of the system are connected so that flow into one side requires a flow out of the other creating a circular circuit. As seen in FIG. 12, the rod side 81 connection from the manifold 80 connects to the main cylinder 18 synchronizing cylinder 82 and then to one end of each main cylinders 18. A piston (not shown) separates the main cylinders 18 into two volumes. One end of each main cylinder 18 is combined with the lift synchronizing cylinder 88. The cap side 83 connection from the manifold 80 connects to the lift synchronizing cylinder 88. The lift synchronizing cylinder 88 has one connection to each lift cylinder 74, but can only apply pressure in one direction since each lift cylinder 74 only has one fluid port. The lift synchronizing cylinder 88 also connects to each main cylinder 18. There is a valve 84 between the lift synchronizing cylinder 88 and each main cylinder 18. In some embodiments, the two main cylinder 18 lines may connect with the lift synchronizing cylinder 88 through the same port using a "T" junction. In this embodiment, only one valve 84 is needed at the base of the "T" junction to control the fluid flow to both cylinders 18. This valve 84 or switch allows fluid to flow from the main cylinder 88 to the lift synchronizing cylinder 88, however, fluid is only allowed to flow from the synchronizing cylinder 88 to the main cylinder 88 when the pressure is above a predetermined minimum amount. The minimum amount of pressure it takes to open the valve 84 is more than the amount of pressure it takes to raise the room 52 with the lift cylinders 74. Valves 84 of this type are known in the industry.

In the embodiment shown in FIG. 12, when room retract is activated pressure is supplied to both the cap 83 and rod 81 side of the manifold 80. As discussed above, the valve 84 prevents fluid from flowing from the lift synchronizing cylinder 88 to the main cylinders 18 until a predetermine pressure is reached. Since it takes less pressure to lift the room 52 than to allow fluid to flow through the valve 84, the pressure from the manifold 80 extends the lift cylinders 74 to raise the room 52. When these cylinders 74 fully lift the room 52, pressure on the cap side 83 will keep increasing until the pressure is sufficient to open valve 84 and allow pressure to act upon the main cylinders 18 to allow the main cylinders 18 to begin to extend. As is known in regenerative hydraulic circuits, even though there will be equal pressure on either side of the main cylinder 18 piston, the difference is areas creates more force on the side of the piston to extend the cylinder 18, which allows the room 52 to retract.

When room extend is activated, pressure is only supplied from the rod side 81 of the manifold 80. The cap side 83 of the system is dumped to tank. Pressure pushes on the rod side 81 of the main cylinders 18 and begins to retract the cylinders 18. The fluid being pushed out of the main cylinders 18 flows freely through the valve 84 in the lift synchronizing cylinder 88 back to tank. As the room is being extended, the lift cylinders 74 do not have any pressure acting on them, so gravity pulls the room 52 downward and retracts the lift cylinders 74 with the fluid going back to the tank.

Since the lift cylinders 74 do not have power during the room's 52 extension, they do not have carrying capacity and gravity is free to act upon the room 52. Ramp assemblies 70 (FIG. 10) are used to help prevent the room 52 from rubbing against and damaging the interior floor 80 of the recreational vehicle 50 during extension. The ramp assemblies 70 provide a raised bearing surface above the interior floor 80 for the room 52 to slide on. The ramp assemblies 70 comprise a low friction surface such as plastic. The ramp assemblies 70 are adjustable vertically to assist the room 52 in not making contact with the finished surface of the interior floor 80 and hold the room's 52 vertical position. The room 52 continues to slide outward on these ramp surfaces 70 until the room 52 drops down the ramp 70 into the position where the interior 80 and slide-out room floor 12 are flush. As seen best in FIGS. 8-10, these ramps 70 have an angled or curved surface and are set in front of the room 52 at a distance below the fully raised height of the lower surface of the room 52, so that the room 52 will not contact the ramps 70 when being retracted.

FIG. 13 shows another embodiment of the invention wherein the lift cylinders 74 and main cylinders 18 are on separate hydraulic circuits. In this embodiment, sensors 94, 96 are used to detect the position of the room 52. Sensors 94, 96 could be any suitable sensors, including electrical, mechanical, magnetic, pressure, or optical. The preferred sensors 94, 96 are combined with the synchronizing cylinders 98, 92 to detect the location of the pistons inside the synchronizing cylinders 98, 92. The location of the pistons inside the synchronizing cylinders 98, 92 correlates to the position of the room 52. The sensors 94, 96 communicate with each other to alert the other when to function.

To retract the room 52 from an extended position, the manifold 90 directs power to the lift cylinders 74 through synchronizing cylinder 98 to lift the room 52. The horizontal retract of the room 52 would not begin until the vertical position switch 94 detects that the room 52 had been lifted fully. As discussed above, the switch 94 is located inside the synchronizing cylinder 98 and is able to detect when the respective pistons have reached a position where the room 52 is fully lifted. Once fully lifted, the switch 94 communicates to the manifold 90 that power can be directed from the manifold 90 to the synchronizing cylinder 92 to activate the horizontal retract of the room 52. Conversely, to move the room 52 from its retracted position to its extended position, power would be directed to the main cylinders 18 through synchronizing cylinder 92 until the horizontal position switch 96 detects that the room 52 is fully extended. At this point the vertical drop would be activated and the room 52 would lower to the fully extended position with both the interior 80 and slide-out room floor 12 being flush. The room 52 may be dropped into position using gravity by not supplying any power to the lift cylinders 74 after the room 52 has been fully extended, or the room 52 may be lowered into place by retracting the lift cylinders 74 under power. This configuration eliminates the need for the ramp assemblies 70 since the room 52 is controlled in each direction by separate circuits which allow the lift cylinders 74 to support the room's 52 weight during extension and retraction.

Having thus described the invention in connection with the preferred embodiments of the invention, it will be evident to those skilled in the art that various revisions and modifications can be made to the specific embodiment described herein without departing from the spirit and scope of the invention. It is our invention, however, that all such revisions and modifications that are obvious to those skilled in the art will be included within the scope of the following claims.

What is claimed is:

1. A system for horizontally moving an expandable room structure between a retracted position within a vehicle and an extended position protruding outwardly from a wall of the vehicle, the system comprising:
   a vehicle wall combined with vertically extending structural members;
   an expandable room structure positioned for movement from a retracted position to an extended position;
   a power device combined with one of the vertically extending structural members of the vehicle wall;
   a first drive chain and a second drive chain each combined with the said one of the vertical structural members of the vehicle wall and each having a plurality of pivotally connected links extending between end links, the links being capable of pivoting in one direction only thereby providing for the chains to be pulled by tensile forces applied to the chains or pushed by compressive forces applied to the chains;
   one of the end links of the first drive chain being operatively connected to the power device and the other end link being operatively connected to the expandable room;
   a rack and pinion mechanism having a first rack operatively combined with the first chain and a second rack operatively combined with the second chain, wherein the first and second rack are operatively combined by a pinion so that movement of the first rack in a first direction causes the second rack to move in a second direction;
   wherein one of the end links of the second drive chain is operatively connected to the expandable room; and
   a first and second guide member combined with the vertically extending structural member containing the power device to guide the first and second drive chains between vertical and horizontal positions, whereby actuation of the main power device causes the chains to move the expandable room between retracted and extended positions.

2. The system of claim 1 further comprising a lift power device mounted in the vertically extending structural member, said lift power device having a support member for supporting the expandable room;
   wherein actuation of the lift power device causes the member to move between a lowered and raised position thereby causing the room to move between a lowered and raised position.

3. A system for horizontally moving an expandable room structure between a retracted position within a vehicle and an extended position protruding outwardly from a wall of the vehicle, the system comprising:
   a vehicle wall including vertically extending structural members that define an opening in the vehicle wall;
   an expandable room structure including top, bottom and side structural members which define an interior end wall and an exterior end wall disposed generally parallel to the vehicle wall and which further define side walls extending generally perpendicular to the interior end wall and exterior end wall, the expandable room being positioned for movement through the opening in the vehicle wall from a retracted position to an extended position;

a power device combined with one of the vertically extending structural members of the vehicle wall adjacent the opening in the wall;

a first drive chain combined with the said one of the vertical structural members of the vehicle wall and having a plurality of pivotally connected links extending between end links, the links being capable of pivoting in one direction only thereby providing for the chain to be pulled by tensile forces applied to the chain or pushed by compressive forces applied to the chain;

one of the end links of the first drive chain being operatively connected to the power device and the other end link being operatively connected to the expandable room with the chain extending mostly vertically when the expandable room is in the extended position and mostly horizontally when the expandable room is in the retracted position;

a second drive chain combined with the said one of the vertical structural members of the vehicle wall and having a plurality of pivotally connected links extending between end links, the links being capable of pivoting in one direction only thereby providing for the chain to be pulled by tensile forces applied to the chain or pushed by compressive forces applied to the chain;

a rack and pinion mechanism having a first rack operatively combined with the first chain and a second rack operatively combined with the second chain, wherein the first and second rack are operatively combined by a pinion so that movement of the first rack in a first direction causes the second rack to move in a second direction;

one of the end links of the second drive chain being operatively connected to the expandable room with the chain extending mostly vertically when the expandable room is in the extended position and mostly horizontally when the expandable room is in the retracted position; and a first and second guide member combined with the vertically extending structural member containing the power device to guide the first and second drive chains between vertical and horizontal positions, whereby actuation of the power device causes the chains to move the expandable room between retracted and extended positions.

4. The system of claim 3 wherein the structural member has a top end and a bottom end and the first guide member is combined with the bottom end of the structural member to guide the first drive chain between its vertical and horizontal position and the second guide member is combined with the top end of the structural member to guide the second drive chain between its vertical and horizontal position.

5. The system of claim 3 wherein the expandable room has a top end and a bottom end; and wherein one of the end links of the first drive chain is operatively connected to the bottom end of the expandable room and one of the end links of the second drive chain is operatively connected to the top end of the expandable room.

6. The system of claim 3 wherein the power device is a hydraulic cylinder.

7. The system of claim 3 wherein the power device is mounted in one of the vertically extending structural members between the first and second guide members.

8. A system for horizontally moving an expandable room structure between a retracted position within a vehicle and an extended position protruding outwardly from a wall of the vehicle, the system comprising:

a vehicle wall combined with at least one vertically extending structural member;

an expandable room structure positioned for movement from a retracted position to an extended position;

a main power device combined with the vertically extending structural member;

a lower drive chain and an upper drive chain each combined with the vertical structural member and having a plurality of pivotally connected links extending between end links, the links being capable of pivoting in one direction only thereby providing for the chains to be pulled by tensile forces applied to the chains or pushed by compressive forces applied to the chains;

one of the end links of the lower drive chain being operatively connected to the main power device and the other end link being operatively connected to the expandable room;

a rack and pinion mechanism having a first rack operatively combined with the lower chain and a second rack operatively combined with the upper chain, wherein the first and second rack are operatively combined by a pinion so that movement of the first rack in a first direction causes the second rack to move in a second direction;

wherein one of the end links of the upper drive chain is operatively connected to the expandable room;

a lower and upper guide member combined with the vertically extending structural member containing the main power device to guide the lower and upper drive chains between vertical and horizontal positions, whereby actuation of the main power device causes the chains to move the expandable room between retracted and extended positions;

a lift power device mounted in the vertically extending structural member, said lift power device having a support member for supporting the expandable room;

wherein actuation of the lift power device causes the member to move between a lowered and raised position thereby causing the room to move between a lowered and raised position.

9. The system of claim 8 wherein the lift power device is a hydraulic cylinder.

10. The system of claim 8 wherein the support member comprises a low friction surface to help the room to slide over it smoothly during actuation of the main power device.

11. The system of claim 8 wherein the recreational vehicle further comprises an interior floor.

12. The system of claim 11 further comprising a ramp assembly to provide a raised bearing surface above the recreational vehicle's interior floor for the room to slide on as it is moved between retracted and extended positions.

13. The system of claim 8 further comprising a second structural member combined with the vehicle wall, said second structural member having a second main power device, a second lift power device, a second lower drive chain, a second upper drive chain, a second rack and pinion mechanism, a second lower guide member, and a second upper guide member.

14. The system of claim 13 wherein the two main power devices and two lift power devices are combined with a manifold.

15. The system of claim 14 wherein the main power devices, lift power devices, and manifold are combined in a regenerative circuit configuration.

16. The system of claim 15 wherein the regenerative circuit configuration further comprises a first synchronizing cylinder for synchronizing the movement of the main power devices.

17. The system of claim 16 wherein the regenerative circuit configuration further comprise a second synchronizing cylinder for synchronizing the movement of the lift power devices.

18. The system of claim 14 wherein the two main power devices are combined with the manifold in a first circuit and the two lift power devices are combined with the manifold in a second circuit so that power can be delivered independently to the main power devices and the lift power devices.

* * * * *